United States Patent
Nielsen

(10) Patent No.: US 11,220,996 B2
(45) Date of Patent: Jan. 11, 2022

(54) CONTROL METHOD FOR A WIND TURBINE

(71) Applicant: VESTAS WIND SYSTEMS, Aarhus N (DK)

(72) Inventor: Johnny Nielsen, Svenstrup J (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 298 days.

(21) Appl. No.: 16/312,924

(22) PCT Filed: Jun. 29, 2017

(86) PCT No.: PCT/DK2017/050219
§ 371 (c)(1),
(2) Date: Dec. 21, 2018

(87) PCT Pub. No.: WO2018/001434
PCT Pub. Date: Jan. 4, 2018

(65) Prior Publication Data
US 2019/0353144 A1    Nov. 21, 2019

(30) Foreign Application Priority Data
Jun. 30, 2016    (DK) .............................. 2016 70481

(51) Int. Cl.
*F03D 7/02* (2006.01)
*F03D 17/00* (2016.01)
*F03D 7/04* (2006.01)

(52) U.S. Cl.
CPC ......... *F03D 7/0224* (2013.01); *F03D 7/0272* (2013.01); *F03D 7/046* (2013.01);
(Continued)

(58) Field of Classification Search
CPC .......... F03D 7/022; F03D 7/024; F03D 7/028; F03D 7/04; F03D 7/042; F03D 7/043;
(Continued)

(56) References Cited

U.S. PATENT DOCUMENTS 8,257,040 B2 * 9/2012 Chen ...................... F03D 17/00
416/1
2007/0193333 A1    8/2007 Wobben
(Continued)

FOREIGN PATENT DOCUMENTS

CN    101245765 A    8/2008
CN    101298864 A    11/2008
(Continued)

OTHER PUBLICATIONS

PCT International Search Report for Application No. PCT/DK2017/050219 dated Sep. 19, 2017.
(Continued)

*Primary Examiner* — Juan G Flores
*Assistant Examiner* — Justin A Pruitt
(74) *Attorney, Agent, or Firm* — Patterson + Sheridan, LLP

(57) ABSTRACT

A wind turbine includes at least one wind speed sensor, a number of pitch-adjustable rotor blades, and a control system for changing the pitch of the rotor blades and/or a generator torque. The the control system determines at time intervals an error parameter as the difference between an estimated wind speed and a measured wind speed as measured by the wind speed sensor. Then, based on a number of pre-defined wind speed intervals, a group of error parameters is obtained over time for each wind speed interval. For each wind speed interval and for each group of error parameters a wind speed offset is determined based on the average of the error parameters within the group which wind speed offsets are used in adjusting the measured wind speed.

15 Claims, 3 Drawing Sheets

(52) U.S. Cl.
CPC .......... *F03D 17/00* (2016.05); *F05B 2220/30* (2013.01); *F05B 2240/21* (2013.01); *F05B 2260/78* (2013.01); *F05B 2260/80* (2013.01); *F05B 2270/20* (2013.01); *F05B 2270/32* (2013.01)

(58) Field of Classification Search
CPC ...... F03D 7/045; F03D 7/0224; F03D 7/0272; F03D 7/046; F03D 17/00; H02P 9/04; G01P 21/02; G01P 21/025; G05B 13/02; G05B 13/0205; G05B 13/024; F05B 2220/30; F05B 2240/21; F05B 2260/78; F05B 2260/80; F05B 2270/20; F05B 2270/32
USPC .......................................................... 415/16
See application file for complete search history.

(56) References Cited

U.S. PATENT DOCUMENTS

| | | | |
|---|---|---|---|
| 2008/0307853 A1* | 12/2008 | Siebers | G01P 21/025 73/1.29 |
| 2009/0183576 A1* | 7/2009 | Honhoff | F03D 17/00 73/861.85 |
| 2010/0052321 A1 | 3/2010 | Bilges et al. | |
| 2013/0181450 A1 | 7/2013 | Narayana et al. | |
| 2013/0320676 A1* | 12/2013 | Kim | F03D 7/00 290/44 |
| 2015/0005966 A1* | 1/2015 | Gerber | F03D 7/042 700/287 |
| 2015/0198144 A1 | 7/2015 | Park et al. | |
| 2015/0285222 A1 | 10/2015 | Chauvin et al. | |

FOREIGN PATENT DOCUMENTS

| | | |
|---|---|---|
| CN | 101334423 A | 12/2008 |
| CN | 101523048 A | 9/2009 |
| EP | 1793123 A2 | 6/2007 |
| EP | 2015082 A2 | 1/2009 |
| EP | 2886853 A1 | 6/2015 |
| WO | 2018001434 A1 | 1/2018 |

OTHER PUBLICATIONS

PCT Written Opinion of the International Searching Authority for Application No. PCT/DK2017/050219 dated Jan. 13, 2017.
Danish Patent and Trademark Office First Techincal Examination for PA 2016 70481 dated Jan. 13, 2017.
Chinese Office Action for application No. 201780052768.5 dated Dec. 20, 2019.
Chinese Office Action for Application No. 201780052768,5 dated Jan. 18, 2021.
Wang et al., "Research on Methods of Controlling Wind Turbines Yaw Optimization Based on Operational Data," Renewable Energy, vol. 34, No. 3, pp. 413-419.

* cited by examiner

CONTROL METHOD FOR A WIND TURBINE

FIELD OF THE INVENTION

The present invention relates to a method of controlling a wind turbine, the wind turbine comprising at least one wind speed sensor, a number of pitch-adjustable rotor blades, and a control system for changing the pitch of the rotor blades and/or a generator torque. The invention furthermore relates to a control system for performing the control method and a wind turbine comprising such control system.

BACKGROUND OF THE INVENTION

Most modern wind turbines are controlled and regulated continuously with the purpose of ensuring maximum power extraction from the wind under the current wind and weather conditions, while at the same time ensuring that the loads on the different components of the wind turbine are at any time kept within acceptable limits.

In order to optimize the power production and reduce the loads of the turbine it is important to know the wind speed and the relative wind direction of the free flow wind. Most often the wind speed and the wind direction are measured by wind sensors placed on different positions on top of the nacelle and the wind turbine rotor is then optimally yawed to face the wind and the wind turbine controlled according to the wind speed.

If the wind direction measurements are off even by one or a few degrees, the resulting misalignment of the turbine rotor may cause increased and different loadings on the wind turbine blades than anticipated, and thereby increased wear and fatigue on the blades, blade root connections, bearings etc. Further, a misalignment of the turbine rotor causes a non-negligible reduction in the power production over time.

Similarly, if the wind speed measurements are off by even just a few percent, the wind turbine may be operated non-optimally causing increased loads and wear or on the other hand a reduced power production.

The measurements from a wind sensor may however far from always be accurate for one reason because the rotor disturbs the free flow wind before reaching the wind sensor. The influence from the rotor on the wind parameter measurements have been seen generally to be more pronounced and significant the larger the rotor.

One way to compensate for this problem is by calibrating or continuously correcting the wind speed sensor measurements by a basic set of Wind Correction Parameters (WCP). These parameters are typically found on a prototype turbine by comparing the measurements from the wind sensors on the turbine with measurements from a nearby Met Mast. Having established a set of wind speed correction parameters, these parameters can then be used to correct the wind speed as measured by a wind speed sensor on all other wind turbines of the same type.

However, it has been found that rotor influence on the wind sensor measurements and thereby on the inaccuracy of the determined wind parameters may also depend strongly on the way the rotor is operated, for example on the pitch angles, and on the rotational speed of the rotor. This also means that the accuracy of the sensed wind speed changes indirectly as a function of the wind speed. This problem may to some extend be reduced by using a set of wind correction parameters which are a function of the wind speed. However, such correction does not fully capture the influence on the rotor operation on the wind measurements since the wind turbine rotor may be operated differently at the same wind speed.

The wind speed is often alternatively or additionally estimated for example based on the power of the wind turbine or on the wind turbine thrust. Estimated wind speeds are however not always accurate for other reasons for example in the case of ice on the blades which would cause a lower power production and thereby a too low estimated wind speed. Furthermore, wind turbine owners most often require data on the power production over time for the wind turbine together with the measured wind speed which data is used by the wind turbine owners to check that the wind turbine delivers the expected power when compared to the available wind. The wind speed data therefore also for that reason needs to be accurate. There is therefore a need and demand for the establishing of reliable and accurate wind speed measurements.

OBJECT OF THE INVENTION

It is an object of embodiments of the present invention to provide a control method for a wind turbine which obviate or reduce some of the above mentioned problems in the known wind speed measurement methods.

It is therefore also an object of embodiments of the present invention to overcome or at least reduce some or all of the above described disadvantages by providing a wind turbine controlling method of reduced risk of non-optimal operation.

A further object of embodiments of the invention is to provide a more precise and robust yet effective method to calibrate or correct the measurements from an existing wind speed sensor with reduced sensitivity to the influence by the rotor and the operational mode of the wind turbine.

A further object of embodiments of the invention is to provide a wind speed calibration method with improved accuracy.

It is a further object of embodiments of the invention to provide a method of improving the wind speed measurements obtained by conventional wind speed sensors and to provide a method of calibrating measurements from a wind speed sensor which may be implemented on existing equipment.

So, in a first aspect the present invention relates to a method of controlling a wind turbine, the wind turbine comprising at least one wind speed sensor, a number of pitch-adjustable rotor blades, and a control system for changing the pitch of the rotor blades and/or a generator torque. The method comprises:

obtaining a number of pre-defined wind speed intervals;
determining at time intervals an error parameter as the difference between an estimated wind speed and a measured wind speed as measured by the wind speed sensor;
obtaining over time and for each wind speed interval a group of error parameters, wherein the error parameters of a group are determined from measured wind speeds falling within the wind speed interval of the group;
determining for each wind speed interval and for each group of error parameters a wind speed offset based on the average of the error parameters within the group;
adjusting the measured wind speed as a function of the wind speed offsets of the different wind speed intervals;
determining a control parameter of the wind turbine as a function of the adjusted wind speed; and controlling the wind turbine according to the control parameter.

Hereby is obtained a simple yet effective control method improving the determination of the wind speed and reducing the risk of non-optimal operation of the wind turbine, as the control parameter is based on adjusted wind speed measurements taking into account how the rotor may have influenced the wind sensor.

By the proposed method the measured wind speeds are adaptively adjusted by comparisons to the wind speed as estimated. The wind speed can be estimated as known in the art based on the produced power together with parameters like the rotor speed, blade pitch angles and aerodynamic profile of the blades and maybe also the air density and relative wind direction. The estimated wind may also be based on a thrust based wind estimator or a combination of more estimation methods. In this way the wind speed is determined based on how the wind turbine performs under the given wind conditions. By adjusting the measured wind speed by using the information of the estimated wind speed is more accurately captured how the wind sensor measurements are often seen to vary significantly not only at different wind speeds but also seen to vary significantly different under different rotor configurations or rotor modes such as for example during normal operation or during de-rating.

Furthermore is obtained a simple and effective control method for reducing the loads and wear on the wind turbine components, as the control parameter is determined based on the adjusted wind speed measurements whereby is obtained a more precise controlling corresponding to the actual wind conditions. Also, the wind turbine is better protected as a more precise controlling of the wind turbine corresponding to the actual wind conditions generally results in better control of the loads on the wind turbine blades and reduced wear on components.

It has been found that the wind speed measurements used to determine the optimal control parameters of the wind turbine can advantageously be adjusted based on a number of wind speed offsets for different wind speed intervals and which are determined from an average difference between a wind speed as measured and as estimated. The wind speed offsets are established by observing over time the difference between the wind speed as measured and as estimated (an error parameter) and for different intervals of the measured wind speed. The algorithm will for each wind speed interval determine a wind speed offset based on the average error parameter for the error parameters within that interval. By measuring and adjusting a wind speed is obtained a more precise method with improved accuracy better capturing that the wind speed is to be adjusted differently in dependence on how the wind turbine is operating and under different wind speeds.

The proposed method wherein the measured wind parameter is adjusted in dependence of an estimation of the wind speed has been seen to yield more accurate and reliable wind speed data and furthermore in an adjustment or calibration method wherein the wind speed offsets used in the adjustment can be adaptively and continuously determined and updated. The proposed method may advantageously be used to adaptively correct the inaccuracy of a wind speed sensor on any individual wind turbine and without use of or the need for any special tools or man power for performing a physical calibration.

Further, in this way the wind speed offsets can be determined and re-determined when desired and considered beneficial for example due to changes to or near the wind sensors, due to seasonal changes, changes in operation setpoints or the like.

For example, the method according to the invention will advantageously adjust the measurements from the wind speed sensor automatically compensating for any changes made on the turbine affecting the airflow around the sensors, like for instance if other sensors or aviation lights are placed close to the wind sensors, without the need for any information on the cause of the changes.

The wind speed offset for the wind speed measurements may be determined initially a first time on any new wind turbine after having been erected, but may likewise be re-estimated later at other times during the lifetime of the wind turbine for example at fixed time intervals such as a number of times every year, or at special times when requested, or may be re-iterated on and re-estimated at regular intervals or continuously.

For example, the method according to the invention can be performed and an updated wind speed offset estimated whenever work or maintenance has been performed on the nacelle thereby ensuring that any changes potentially affecting the measurements from the wind speed sensors would be taken into account.

The control method may be implemented on new or existing wind turbines as pure software implementation with no need for any additional hardware on the turbine or may be implemented as a combination of software and hardware.

The control parameter may preferably by a pitch parameter of one or more of the rotor blades and the controlling of the wind turbine then comprises pitching the wind turbine blades according to the pitch parameter. Hereby the pitch parameter of the turbine is based on more accurate wind speed data improving the control of the wind turbine.

The control parameter may alternatively or additionally comprise other control parameters which to some extend depends on the wind speed, such as a rotational speed of the rotor.

In an embodiment, the control parameter comprises a torque parameter and the controlling of the wind turbine then comprises adjusting the torque of a wind turbine according to the torque parameter. As with the abovementioned other control parameters, the torque parameter of the turbine can hereby be determined based on more accurate wind speed data which ensures an improved and more optimal control of the wind turbine corresponding to the wind conditions.

In an embodiment the wind parameter is a wind speed as measured for example by an anemometer, such as an ultrasonic anemometer, a mechanical anemometer (such as a cup or vane anemometer), or a Laser Doppler anemometer.

The pre-defined intervals for the wind speed are preferably successive intervals but some or all may alternatively in an embodiment be partially overlapping.

In an embodiment, a number such as in the order of 3, 5, 10, 20, or 25 wind speed offsets are determined based on 3, 5, 10, 20, or 25 wind speed intervals, respectively. The more intervals the more refined the wind speed adjustment may be. In an embodiment the wind speed regime is divided into wind speed intervals each of 1 m/s.

The error parameter is determined at time intervals such as for example every 1, 2, or 10 seconds or the similar, or every minute, a number of times every second or every minute, every hour or every day etc, and/or for example for each wind speed measurement made. Preferably an error parameter is determined at each sample such as several times per second. Short intervals are advantageous in reducing the risk of obtaining the data during a yaw operation where the data may in some cases potentially be cluttered.

A wind direction offset is then determined for each wind speed interval based on a group of error parameters obtained over time. In other words, each error parameter is grouped and associated to one or more wind speed interval based on the measured wind speed used in determining the error parameter. If some of the wind speed intervals are overlapping, an error parameter can be assigned to more groups and more wind speed intervals.

The wind speed offsets are then advantageously used to adjust the wind speed measurements corresponding to a calibration of the wind speed sensor. The wind speed is adjusted as a function of the wind direction offsets, such as by a simple subtraction, by a linear function or some other functions. Likewise the adjustment may be performed by a PI or PID control.

In an embodiment of the invention, the measured wind speed is adjusted as a function of the wind speed offset of the wind speed interval comprising the measured wind speed at the time of adjusting. In this way the wind speed offset of one wind speed interval then is simply applied to adjust the measured wind speed when falling within the range of that interval.

In an embodiment of the invention, the measured wind speed is adjusted by an interpolation between the wind speed offsets of the different wind speed intervals. In this way the accuracy of the applied wind speed offsets to adjust the relative wind speed is further improved.

In an embodiment of the invention, an error parameter is disregarded if the error parameter is above a predetermined threshold. This predetermined threshold may be set to correspond to a difference between the measured and estimated wind speeds larger than for example 5-10%, or to for example a wind speed difference of 0.7 m/s, 1.0 m/s or in that range, or a combination of both. Hereby only differences of reasonable sizes will be used in the determination of the wind speed offsets and with the underlying rationale that larger differences may indicate untrustworthy estimates or measurements for example due to drastic changes in wind speed, some operational parameter of the wind turbine or the like. Hereby the data observations with lower reliability are not taken into account in the determination of the wind speed offsets whereby the determination of the wind speed offsets becomes more accurate and robust.

In an embodiment of the invention, the estimated wind speed is determined as a function of a wind turbine power. The wind turbine power may be determined by measuring a grid power or by estimating a generator output power. In an embodiment of the invention, the estimated wind speed is determined as a function of a wind turbine thrust. The estimated wind speed can advantageously and effectively be determined from the wind turbine power and/or thrust together with parameters like the rotor speed, blade pitch angles and aerodynamic profile of the blades and optionally also the air density and relative wind direction.

In an embodiment, the estimated wind speed is based on a number of wind speeds estimated in different ways. Hereby, the estimated wind speed can be determined more accurately with more certainty which in turn improves the accuracy of the wind speed offsets. As an example the estimated wind speed can be determined as the average of the different wind speed estimations. Also, this makes it possible to determine the estimated wind speed by one method in some weather conditions or under some operational conditions, and use another wind speed estimation under other conditions. It is for example known that a wind speed estimation based on the power may be inaccurate if ice is formed on the blades. Therefore, the wind speed estimation can preferably be based on other types of wind speed estimations at ambient temperatures below zero degrees.

According to a further embodiment of the invention, a group of error parameters for a wind speed interval is determined over a predetermined time period, such as over one week or a pre-set number of days. The length of the time period may alternatively or additionally be set in dependence of other parameters such as for example the time of year, the general weather conditions, the desired accuracy of the wind speed offset or the time since the last estimation of a wind speed offset.

In an embodiment of the invention a group of error parameters for a wind speed interval is determined based on a predetermined number of error parameters in the group. Hereby is ensured that the wind speed offset is obtained based on a sufficiently large number of data in order to ensure a sufficient or a certain desired quality of the estimation of the wind speed offset. A sufficient number of data may under some weather conditions take longer time to obtain or may under some weather conditions be obtained faster than expected.

According to a further embodiment of the invention the steps of obtaining a group of error parameters and determining a wind speed offset are repeated at time intervals. I.e. a new updated wind speed offset may be determined at time intervals, such as more or less continuously, after a week or a month from the last determination, or upon request, or after every shut down of the wind turbine, or combinations hereof.

According to embodiment of the invention, the adjusting of the wind speed comprises subtracting the wind speed offset times a gain factor smaller than one, wherein the gain factor is in the interval of 0.1-0.95, such as in the interval of 0.4-0.6, such as equal to 0.5. Hereby too abrupt changes to the wind speed measurements are avoided and an improved convergence may be obtained.

In yet a further embodiment of the invention, the measured wind speed is further adjusted as a function of earlier wind speed offsets whereby abrupt changes to the wind speed measurements and thereby to the control parameter may be avoided and whereby switching back and forth between values may likewise be avoided. For example, the wind speed may be adjusted by a subtraction of the wind speed offset, and further a subtraction of the change in wind speed offset from the last to the present adjustment and times a gain factor.

In a further aspect the present invention relates to a control system for a wind turbine comprising at least one wind speed sensor and a number of pitch-adjustable rotor blades, the control system being configured to perform the steps of:

obtaining a number of pre-defined wind speed intervals;
    receiving a wind speed as measured by the wind sensor,
    determining at time intervals an error parameter as the difference between an estimated wind speed and the measured wind speed;
    obtaining over time and for each wind speed interval a group of error parameters, wherein the error parameters of a group are determined from measured wind speeds falling within the wind speed interval of the group;
    determining for each wind speed interval and for each group of error parameters a wind speed offset based on the average of the error parameters within the group;
    adjusting the measured wind speed as a function of the wind speed offsets of the different wind speed intervals;

determining a control parameter of the wind turbine as a function of the adjusted wind speed; and controlling the wind turbine according to the control parameter.

In a further aspect the present invention relates to a wind turbine comprising a control system according to the above.

The advantages of the control system and the wind turbine comprising such control system are as described in relation to the control method in the previous.

BRIEF DESCRIPTION OF THE DRAWINGS

In the following different embodiments of the invention will be described with reference to the drawings, wherein.

DETAILED DESCRIPTION OF THE DRAWINGS

It is known that the measured wind speed is highly influenced by the rotor. This influence varies from turbine to turbine, from site to site and over time on the same turbine. This means that the measured wind speed will have some additional inaccuracy due to these variations in rotor influence.

The basic idea of this method is to use an estimated wind speed(s) to adaptively adjust the wind speed measured by the wind sensors. The estimated wind speed can be based on the produced power together with parameters like the rotor speed, blade pitch angles and aerodynamic profile of the blades and maybe also the air density and relative wind direction.

The estimated wind can also be determined from a trust based wind estimator, or a combination of those two.

Figure 1:
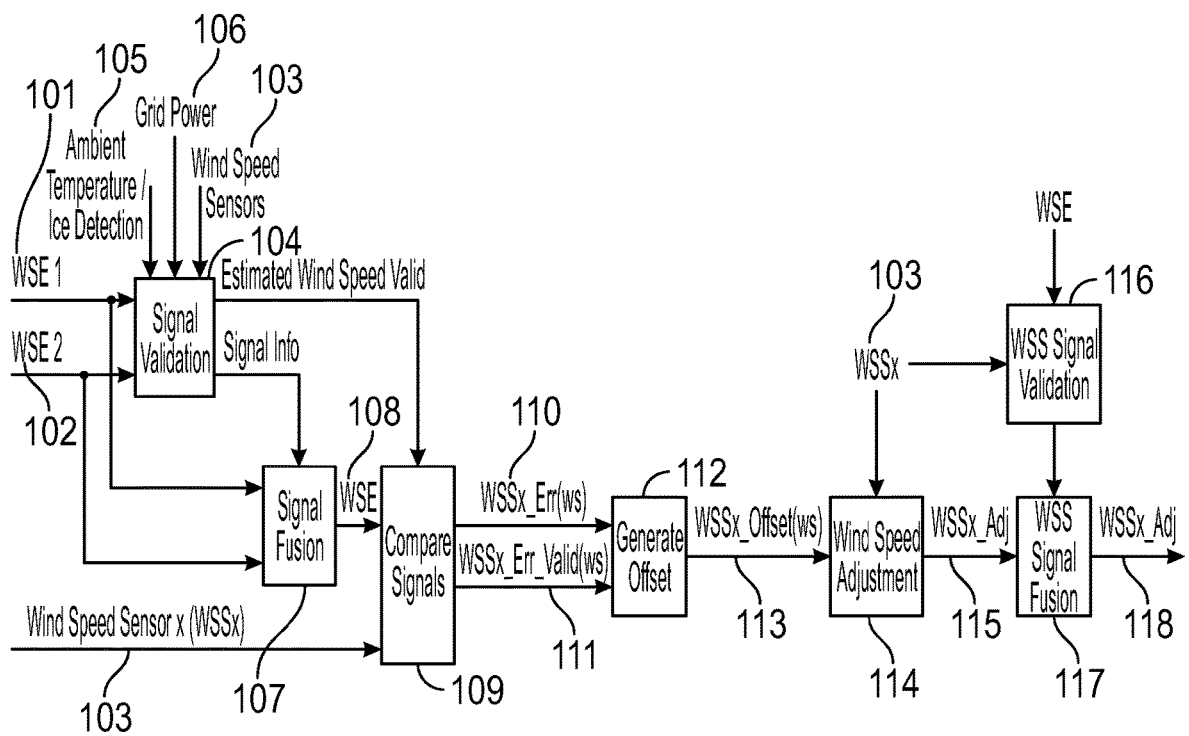
FIG. 1 illustrates the functionality of the control method according to an embodiment of the invention.

An overview of the functionality of the control method and wind speed adjustment according to an embodiment of the invention is shown in FIG. 1.

Firstly, WSE1 and WSE2 are the Estimated Wind Speeds, 101, 102 which can be based on power or thrust or something else. WSSx, 103 are wind speed measurements from one or more wind speed sensors.

In the "Signal Validation" block, 104, the different estimated wind speeds, 101, 102 are validated based on for instance the grid power 106, wind speed measurements 103 from the wind sensors, and if ice is detected on the blades and/or the wind sensors, 105. The ice detection can in simple cases be based on if the ambient temperature is below zero degrees. A grid power 106 revealing that the wind turbine is not or only in partial production may be used to disregard or modify a wind speed estimation based on the power. Similarly ice on the blades is known to affect the power production and so the wind speed estimation based on a power may not be accurate in such situations. Other data may be used in the validation as well.

Based on the validation of each of the estimated wind speed signals 101, 102 the different signals are (in the "Signal Fusion" block) fused together in one estimated wind speed "WSE", 108. The fusion may for example be a simple average of the validated signals or a weighted average in dependence of the estimated validity of each signal. Alternatively, the fusion may simply comprise disregarding some of the signals or choosing the 'best' wind speed estimation under the detected conditions. The fusion may alternatively comprise choosing the power based wind estimation unless this signal is not validated in which case another signal is chosen as the resulting one estimated wind speed WSE.

Figure 2:
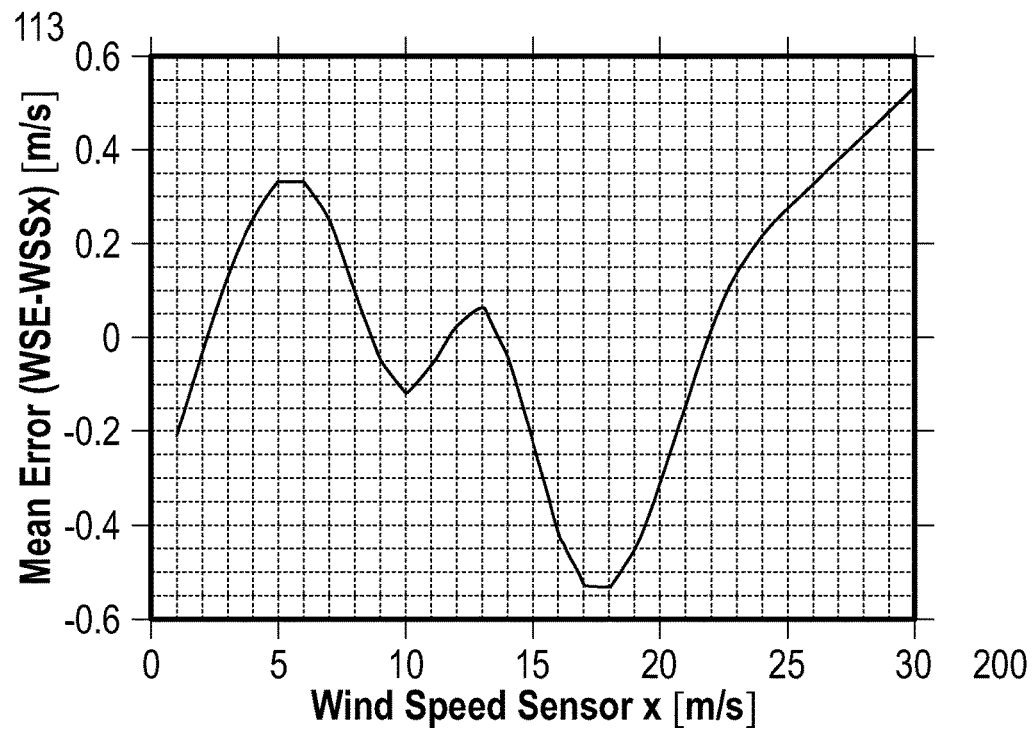
FIG. 2 shows a set of wind speed offsets as a function of the wind speed.

Having determined a valid estimated wind speed WSE, 108, then the estimated wind speed, 108 is compared to the signals from each of the measured wind speeds WSSx, 103, determining an error parameter as the difference between the estimated and measured wind speed. This is done for different wind speed intervals, 200, for instance for each interval of 1 m/s as shown in FIG. 2.

Figure 3:
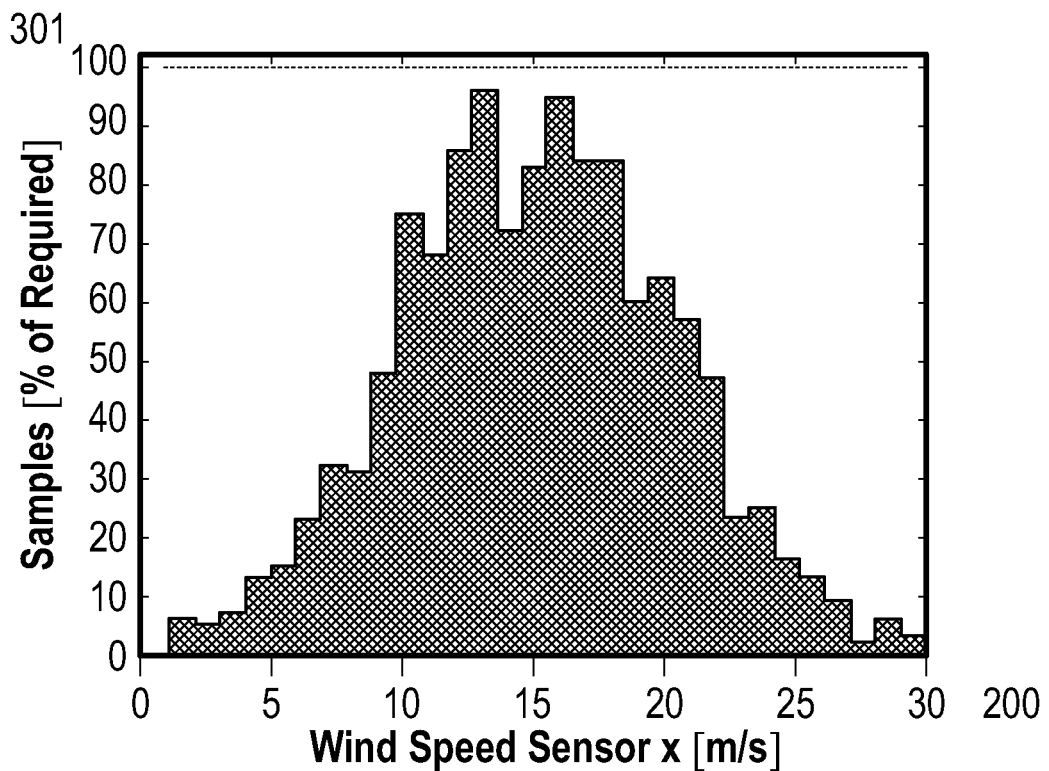
FIG. 3 illustrates the building up of groups of error parameters for the different wind speed intervals according to an embodiment of the invention.

When there is enough data and error parameters for a given wind speed bin the "Compare Signals" block, 109 will output a "WSSx_Err(ws)" signal, 110 for the given wind speed interval (ws) together with a "WSSx_Err_Valid(ws)" signal, 111 indicating that the wind speed error parameters for the given wind speed (ws) can be used. In FIG. 3 is shown the percentage 301 of the required number of samples (number of error parameters) for each wind speed interval, 302, at some time during operation. When a percentage 301 for a wind speed interval 200 reaches 100% (i.e. the desired number of error parameters has been gathered for that specific wind speed interval), the "WSSx_Err_Vaild(ws)" signal 111 for that wind speed interval will change to "true" meaning that the "WSSx_Err(ws)" signal 110 for that wind speed interval can be used in generating a wind speed offset for that wind speed interval.

This is performed in the "Generate Offset" block, 112 where a controller generates an offset "WSSx_Offset(ws)" 113 for the given wind speed interval 200. This offset can for instance be the average of the error parameters "WSSx_Err (ws)" for the given wind speed interval and optionally times a gain (0.2-1.0). When a offset 113 is generated for a given wind speed interval, the "WSSx_Err(ws)", 110 and "WSSx_Err_Valid(ws)", 111 signals for that wind speed bin or interval are cleared. The number of samples (error parameters) at the given wind speed bin is also cleared and the collection of data for that wind speed interval can start over again.

In the "Wind Speed Adjustment" block, 114 in FIG. 1 the measured wind speed, "WSSx", 103 is adjusted to yield an adjusted wind speed "WSSx_Adj", 115 based on the different wind speed offsets generated for different wind speed intervals and for the different wind sensors x. The adjustment can be done based on interpolation between the offsets for the different wind speed intervals to get a more smooth adjustment.

Optionally, based on a validation "WSS Signal Validation", 116 of each of the adjusted wind speeds, "WSSx_Adj", 115, the signals can be fused to a single value for an adjusted wind speed "Wss_Adj", 118 signal in the "WSS Signal Fusion" block, 117. The estimated wind speed "WSE" can be used as input to the "WSS Signal Validation"

Figure 5:
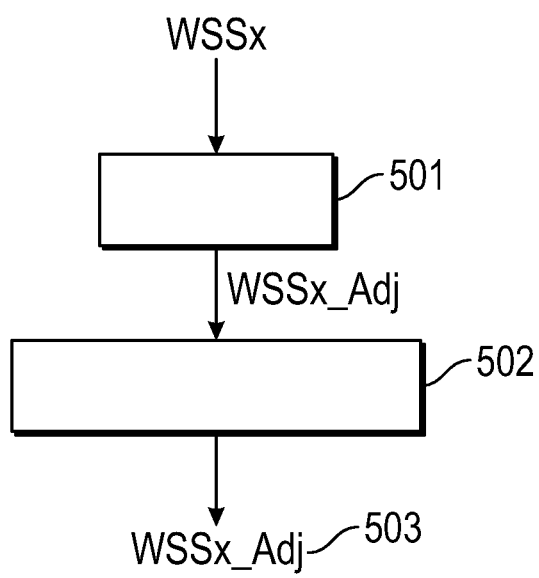
FIG. 5 illustrates a compensation and fusion of the wind speed signals from different sensors.

A simple flowchart diagram for the adjustment and fusion of the wind speed signals from the different sensors is shown in FIG. 5.

FIG. 2 shows the wind speed offsets 113 for the wind speed sensor x determined according to an embodiment of the invention and as a function of the wind speed as measured by the wind direction sensor x, 201. A number of wind speed offsets have here been determined for a number of different wind speed intervals 200 of every 1 m/s in an entire production wind speed range (traditionally 3-25 m/s), and then interpolated in between. It is noted that the wind speed offset is highly changing with the wind speed and for all wind speeds.

Figure 4:
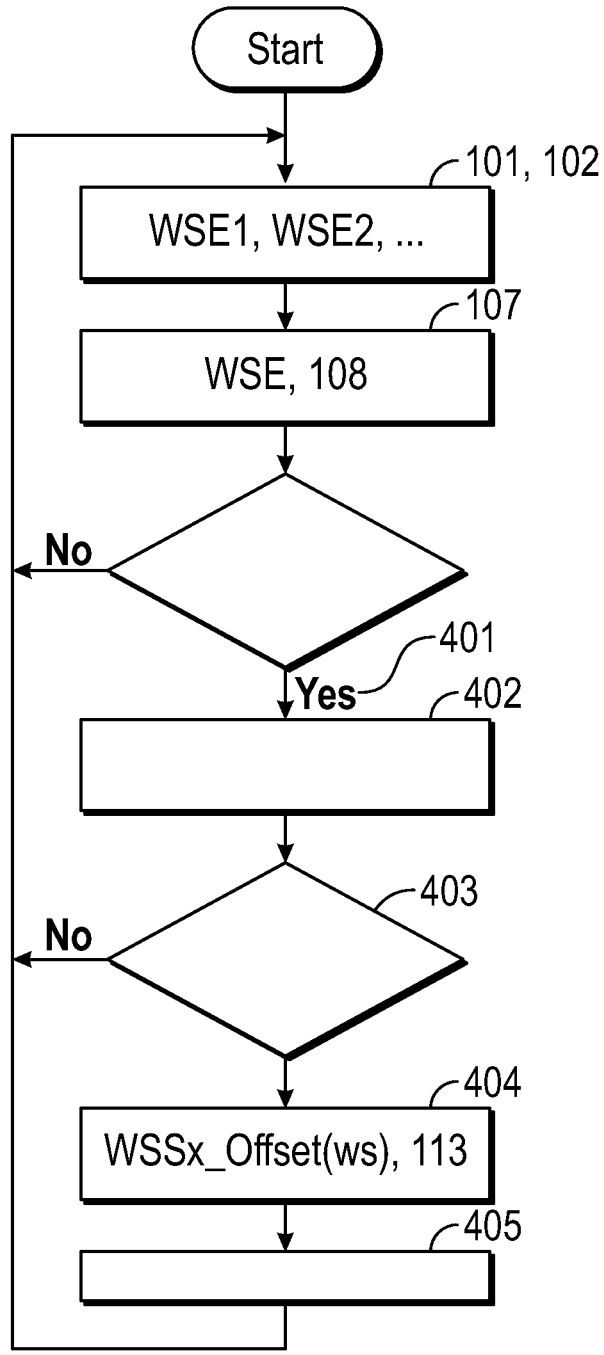
FIG. 4 is a flow charts illustrating an embodiment of the invention.

A flowchart diagram for the method to generate a set of wind speed offsets (an example is shown in FIG. 2) for a given wind speed sensor x is shown in FIG. 4.

Firstly, one or more estimates of wind speeds, WSE1, WSE2, 101, 102 are determined. For example as mentioned in the previous based on the wind turbine power, the thrust or the like. If multiple estimates are made, the different estimates are then fused, 107, to a single wind speed estimate, WSE, 108, based on the current quality of each of the estimates. The wind speed estimate, WSE, 108 may further be compares to the measured wind speed signals from each of the wind speed sensors. If the difference between the estimated and measured wind speed is within a certain threshold, 401, then the determined difference (error parameter) is grouped or binned to the relevant wind speed interval, 402. The number of error parameters for the relevant wind speed interval is updated accordingly. Over time, when a sufficient number of error parameters have been reached for a specific wind speed interval, 403, a wind speed offset for that wind speed interval is determined as the mean or average difference between estimated and measured wind speeds for that interval and for a given sensor, 404. The group of data for that wind speed interval and wind speed sensor is then cleared, 405, and a new set of data can be gathered is desired.

FIG. 5 is a flowchart illustrating a compensation and fusion of the wind speed signals from different wind speed sensors. The wind speed signal for the sensor x is first compensated based on the wind speed offset for the relevant wind speed interval based on the current wind speed, 501. The hereby compensated wind speed signal from each of the number of wind speed sensors x, y, z, . . . are then fused, 502 to a single wind speed signal, 503. This may for example be performed based on a simple averaging and/or based on the current quality of each of the wind speed sensors. For example, some sensors may be known to perform poorly at very low temperatures or in rain, and are therefore disregarded in the fusing when the temperature is low or if it rains.

While embodiments of the invention have been shown and described, it will be understood that such embodiments are described by way of example only and it will be appreciated that features of different embodiments may be combined with one another. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method of controlling a wind turbine, the wind turbine comprising at least one wind speed sensor, a plurality of pitch-adjustable rotor blades, and a control system for changing at least one of a pitch of the plurality of rotor blades or a generator torque, the method comprising:
  obtaining a plurality of wind speed intervals;
  determining, for a first wind speed interval of the plurality of wind speed intervals, a first plurality of differences, wherein each of the first plurality of differences is between (i) a respective first wind speed measured by the at least one wind speed sensor and falling within the first wind speed interval and (ii) a respective first estimated wind speed that is estimated at a time corresponding to when the respective first wind speed was measured;
  determining, for a second wind speed interval of the plurality of wind speed intervals, a second plurality of differences, wherein each of the second plurality of differences is between (i) a respective second wind speed measured by the at least one wind speed sensor and falling within the second wind speed interval and (ii) a respective second estimated wind speed that is estimated at a time corresponding to when the respective second wind speed was measured;
  averaging the first plurality of differences to produce a first wind speed offset for the first wind speed interval;
  averaging the second plurality of differences to produce a second wind speed offset for the second wind speed interval;
  upon determining that a third wind speed measured by the at least one wind speed sensor falls within the first wind speed interval, adjusting the third wind speed based on the first wind speed offset rather than the second wind speed offset to correct for a disturbance disruption to the third wind speed caused by rotation of the plurality of rotor blades and to produce an adjusted wind speed;
  determining a control parameter of the wind turbine as a function of the adjusted wind speed; and
  controlling the wind turbine according to the control parameter.

2. The method of controlling according to claim 1, wherein a difference of the first plurality of differences is disregarded if the difference of the first plurality of differences is above a predetermined threshold.

3. The method of controlling according to claim 1, wherein the respective first estimated wind speed is determined as a function of a power produced by the wind turbine.

4. The method of controlling according to claim 3, wherein the power produced by the wind turbine is determined by measuring a grid power or by estimating a generator output power.

5. The method of controlling according to claim 1, wherein the respective first estimated wind speed is determined as a function of a wind turbine thrust.

6. The method of controlling according to claim 1, wherein the respective first estimated wind speed is based on a number of wind speeds estimated in different ways.

7. The method of controlling according to claim 1, wherein a group of differences from the first plurality of differences is determined over a predetermined time period.

8. The method of controlling according to claim 1, wherein a group of differences from the first plurality of differences is determined based on a predetermined number of differences in the group of differences.

9. The method of controlling according to claim 1, wherein determining the first wind speed offset is repeated at time intervals.

10. The method of controlling according to claim 1, wherein producing the second wind speed offset is repeated a predefined number of times.

11. The method of controlling according to claim 1, wherein applying the first wind speed offset to the third wind speed comprises subtracting from the third wind speed the first wind speed offset times a gain factor smaller than one, wherein the gain factor is in an interval of 0.1-0.95.

12. The method of controlling according to claim 1, wherein the control parameter comprises a pitch parameter and the controlling of the wind turbine comprises adjusting the pitch of one of the plurality of rotor blades of the wind turbine according to the pitch parameter.

13. The method of controlling according to claim 1, wherein the control parameter comprises a torque parameter and controlling of the wind turbine comprises adjusting a torque of a generator of the wind turbine according to the torque parameter.

14. A control system for a wind turbine comprising at least one wind speed sensor and a plurality of pitch-adjustable rotor blades, the control system being configured to:
   obtain a plurality of wind speed intervals;
   determine, for a first wind speed interval of the plurality of wind speed intervals, a first plurality of differences, wherein each of the first plurality of differences is between a respective first wind speed measured by the at least one wind speed sensor and falling within the first wind speed interval and (ii) a respective first estimated wind speed that is estimated at a time corresponding to when the respective first wind speed was measured;
   determine, for a second wind speed interval of the plurality of wind speed intervals, a second plurality of differences, wherein each of the second plurality of differences is between (i) a respective second wind speed measured by the at least one wind speed sensor and falling within the second wind speed interval and (ii) a respective second estimated wind speed that is estimated at a time corresponding to when the respective second wind speed was measured;
   average the first plurality of differences to produce a first wind speed offset for the first wind speed interval;
   average the second plurality of differences to produce a second wind speed offset for the second wind speed interval;
   upon determining that a third wind speed measured by the at least one wind speed sensor falls within the first wind speed interval, adjust the third wind speed based on the first wind speed offset rather than the second wind speed offset to correct for a disturbance to the third wind speed caused by rotation of the plurality of rotor blades and to produce an adjusted wind speed;
   determine a control parameter of the wind turbine as a function of the adjusted wind speed; and
   control the wind turbine according to the control parameter.

15. A wind turbine, comprising:
   a tower;
   a nacelle disposed on the tower;
   a rotor extending from the nacelle;
   a plurality of pitch-adjustable rotor blades connected to the rotor;
   a wind speed sensor; and
   a control system configured to:
      obtain a plurality of wind speed intervals;
      determine, for a first wind speed interval of the plurality of wind speed intervals, a first plurality of differences, wherein each of the first plurality of differences is between (i) a respective first wind speed measured by the wind speed sensor and falling within the first wind speed interval and (ii) a respective first estimated wind speed that is estimated at a time corresponding to when the respective first wind speed was measured;
      determine, for a second wind speed interval of the plurality of wind speed intervals, a second plurality of differences, wherein each of the second plurality of differences is between (i) a respective second wind speed measured by the wind speed sensor and falling within the second wind speed interval and (ii) a respective second estimated wind speed that is estimated at a time corresponding to when the respective second wind speed was measured;
      average the first plurality of differences to produce a first wind speed offset for the first wind speed interval;
      average the second plurality of differences to produce a second wind speed offset for the second wind speed interval;
      upon determining that a third wind speed measured by the wind speed sensor falls within the first wind speed interval, adjust the third wind speed based on the first wind speed offset rather than the second wind speed offset to correct for a disturbance to the third wind speed caused by rotation of the plurality of rotor blades and to produce an adjusted wind speed;
      determine a control parameter of the wind turbine as a function of the adjusted wind speed; and
      control the wind turbine according to the control parameter.

* * * * *